(12) United States Patent
Nada-Ali

(10) Patent No.: US 12,554,272 B2
(45) Date of Patent: Feb. 17, 2026

(54) SYSTEM FOR OPERATING A VALVE

(71) Applicant: TREVITEK LTD, London (GB)

(72) Inventor: Belal Nada-Ali, New Malden (GB)

(73) Assignee: Belal Nada-Ali, London (GB)

( * ) Notice: Subject to any disclaimer, the term of this patent is extended or adjusted under 35 U.S.C. 154(b) by 0 days.

(21) Appl. No.: 19/110,934

(22) PCT Filed: Oct. 6, 2023

(86) PCT No.: PCT/GB2023/052605
§ 371 (c)(1),
(2) Date: Mar. 12, 2025

(87) PCT Pub. No.: WO2024/079441
PCT Pub. Date: Apr. 18, 2024

(65) Prior Publication Data
US 2026/0010182 A1 Jan. 8, 2026

(30) Foreign Application Priority Data
Oct. 10, 2022 (GB) ..................................... 2214912

(51) Int. Cl.
| | |
|---|---|
| *G05D 7/06* | (2006.01) |
| *A47J 31/46* | (2006.01) |
| *A47J 31/52* | (2006.01) |
| *A47J 31/54* | (2006.01) |
| *A47J 31/58* | (2006.01) |
| *E03C 1/04* | (2006.01) |
| *E03C 1/02* | (2006.01) |

(52) U.S. Cl.
CPC .......... *G05D 7/0635* (2013.01); *A47J 31/461* (2018.08); *A47J 31/525* (2018.08); *A47J 31/54* (2013.01); *A47J 31/58* (2013.01); *E03C 1/0411* (2013.01); *E03C 2001/026* (2013.01)

(58) Field of Classification Search
CPC .. G05D 7/0635; G05D 7/0629; G05D 7/0617; A47J 31/461; A47J 31/525; A47J 31/54; A47J 31/38; A47J 31/465; A47J 31/5253; A47J 31/545; E03C 1/0411; E03C 2001/026; E03C 1/041; F16K 37/005; F16K 37/0091
USPC .................................. 137/5, 392, 400, 487.5
See application file for complete search history.

(56) References Cited

U.S. PATENT DOCUMENTS

| | | | | |
|---|---|---|---|---|
| 7,069,357 | B2 * | 6/2006 | Marx ..................... | H03K 17/96 345/173 |
| 8,776,817 | B2 * | 7/2014 | Sawaski ................. | E03C 1/057 137/551 |
| 2016/0338527 | A1 * | 11/2016 | Burrows ................. | A47J 31/56 |
| 2017/0119195 | A1 * | 5/2017 | Al-Shaibani .......... | A47J 31/525 |

* cited by examiner

*Primary Examiner* — Craig M Schneider
*Assistant Examiner* — Andrew J Rost

(57) ABSTRACT

The present disclosure provides a system (100) for operating a valve in an apparatus for dispensing heated conductive liquid and, more specifically, for implementing an automated safety shut off mechanism in the valve the moment that the liquid comes into contact with a user's body. The system operates by coupling a sensor (104) to a control element (106) such as a button that operates the liquid dispensing apparatus, and also introducing an electric current into the flow of liquid. When a user holds the button and comes into contact with the flow of heated liquid, the sensor detects the current from the flow and a controller shuts off the valve (108).

14 Claims, 2 Drawing Sheets

SYSTEM FOR OPERATING A VALVE

FIELD OF INVENTION

The present invention relates generally to valve control systems. More specifically, the present invention relates to a system for implementing an automated safety shut-off mechanism in valves that control the flow of heated conductive fluids.

BACKGROUND

Boiling water taps and coffee machines which dispense water at very high temperatures have become an ever-present fixture of modern life, both in the home and in the commercial environment.

These types of hot water dispensers are highly convenient, but of course they carry with them serious safety risks, especially if left unattended in areas which children have access to. A user will typically press and hold down a button on the apparatus, which will then dispense a flow of boiling water until contact with the button is stopped. A normal human's reaction time is not fast enough to let go of the button the instant the water comes into contact with their body, and the delay between feeling the pain from the hot water and letting go of the button can significantly worsen the damage done to the skin.

While control and safety valve mechanisms are known, there are none known in the art capable of automatically stopping a flow of hot liquid as soon as it comes into contact with a user.

It is within this context that the present invention is provided.

SUMMARY

The present disclosure provides a system for operating a valve in an apparatus for dispensing heated conductive liquid and, more specifically, for implementing an automated safety shut off mechanism in the valve the moment that the liquid comes into contact with a user's body. The system operates by coupling a sensor to a control element such as a button that operates the liquid dispensing apparatus, and also introducing an electric current into the flow of liquid. When a user holds the button and comes into contact with the flow of heated liquid, the sensor detects the current from the flow and a controller shuts off the valve.

According to a first aspect of the present disclosure, there is provided a system for controlling a valve in an apparatus for delivering heated conductive fluid, the system comprising: a conduit for delivering a flow of heated conductive fluid; a power source configured to deliver an electric current into the flow; a valve coupled to the conduit and configured to control the flow; a control element, the control element being configured to, upon actuation by a conductive body, cause the valve to open until the actuation is ceased; and at least one sensor coupled to the control element.

The system further comprises a controller, the controller being configured to: receive a reading from the at least one sensor; determine that the conductive body has come into contact with the electric current from the power source; and override the control element and operate the valve to shut off the flow of heated conductive fluid.

In some embodiments the controller is further configured to, upon a first actuation of the control element by a conductive body: receive a plurality of readings from the sensor; determine an average value for that conductive body from the plurality of readings; and wherein the determination that the conductive body has come into contact with the electric current from the power source is based at least in part on the average value determined for that body.

The controller may also be further configured to determine a maximum threshold parameter based on the average value for a given conductive body and the amount of electric current being introduced to the flow of fluid, and to determine that the conductive body has come into contact with the electric current from the power source when a value equal to or greater than the threshold parameter is received from the sensor.

The controller may also be further configured to recalculate the threshold parameter periodically during an actuation of the control element.

In some embodiments the sensor is a current sensor configured to determine the voltage potential of any conductive body that comes into contact with the control element.

In such examples, the sensor is also be coupled to the conduit such that the sensor detects the voltage potential between the flow of fluid and the control element when both are in contact with a conductive body.

In some embodiments the controller is further configured to cause the power source to introduce the electric current into the flow of fluid in response to actuation of the control element.

In some embodiments the controller is further configured to, after a predetermined amount of time has elapsed since operating the valve to shut off the flow, determine that the conductive body is still in contact with the control element and re-open the valve.

In some embodiments the electric current introduced by the power source is a DC current. The DC current is introduced using a voltage between, for example, 0 and 240V.

In other embodiments the electric current introduced by the power source is an AC current.

In some embodiments the control element is a touch-sensitive button.

In some embodiments the conduit is the pipe of a boiling water tap.

In some embodiments the conduit is insulated from the power source such that the power source is coupled directly to the flow of fluid only when the valve is open.

BRIEF DESCRIPTION OF THE DRAWINGS

Various embodiments of the invention are disclosed in the following detailed description and accompanying drawings.

Figure 1:
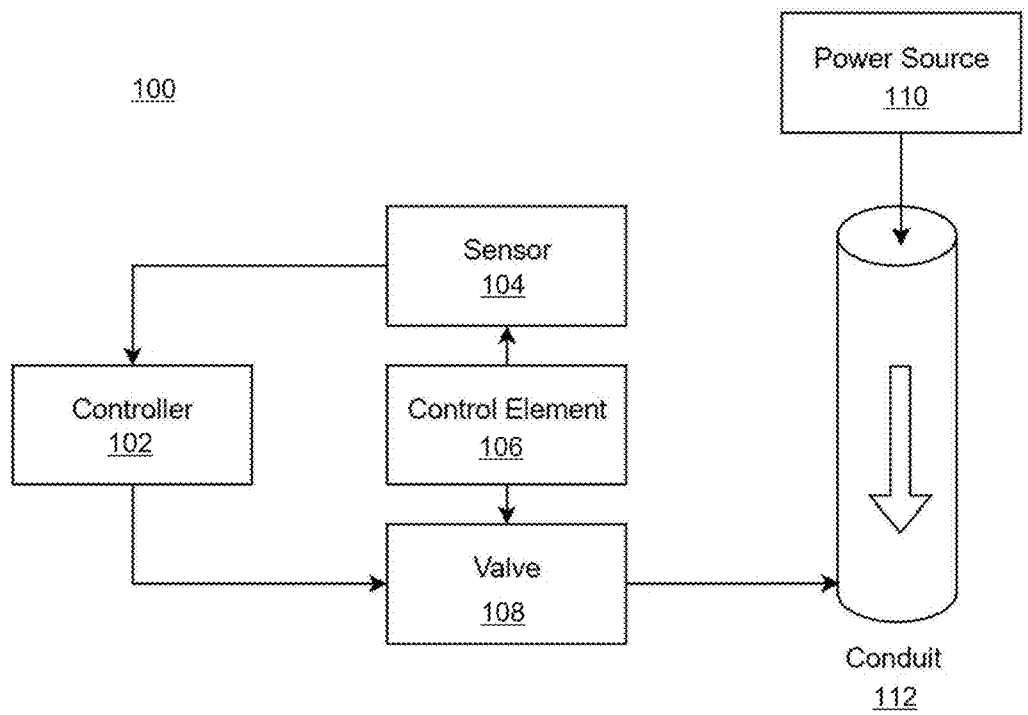
FIG. 1 illustrates a block diagram of an example configuration of the physical components of the disclosed system.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The system and methods of the present disclosure are highly versatile in nature and design, and can be applied not only as a safety feature of coffee machines and boiling water faucets, but with any apparatus for dispensing heated conductive fluid that a user could be at risk of burning themselves with.

The system and methods disclosed herein prevent long term damage to the skin of users by closing valves of apparatus distributing a flow of heated fluid and stopping those flow more quickly than any humanly possible response could. This fractional time difference can be the difference between escaping unscathed and long term skin damage. It is especially important for preventing injury to the disabled, elderly & children as their reaction speeds are considerably slower. It can also be used in corporate environments to prevent injury claims and to enable higher temperatures and flow rates to be used without risk.

The system can be incorporated into existing faucets or installed as a whole.

Referring to FIG. 1, a block diagram of an example configuration of the physical components of the disclosed system 100 is shown.

As can be seen, the system comprises a controller 102, such as a microcontroller, which is coupled to receive readings from a sensor 104 and a valve 108. The sensor 104, which may be a current sensor for detecting a potential difference across a conductive body, is configured to measure a value (i.e. potential difference) across a control element 106 and a reference point. The control element 106 is in some examples a pushbutton which is configured to operate the valve 108. Valve 108 controls the flow of fluid through a conduit 112 such as a tap or boiling water dispenser in a coffee machine. Controller 102 can also control the valve 108, overriding the control element 106.

The sensor 104 is arranged so that it is also in contact with the flow of fluid passing through conduit 112 when the valve is shut off, for example, if that is to be used as a reference point for the potential difference. In such cases, the sensor 104 should be arranged so that it does not touch any conductive parts of the conduit.

The principle of the present disclosure is that an electrically detectable signal, such as for example a DC current, is introduced to the liquid that flows through conduit 112 by a power source 110. When the liquid comes into contact with a conductive body that is also in contact with the control element 106, such as a user holding down the control element 106 who has accidentally put their skin under the hot liquid flow, the sensor 104 will detect the signal from the power source 110 and the controller 102 can respond and control the valve 108 to shut off the flow.

The controller 102 may implement various operations for detecting such occurrences with accuracy and preventing false detections.

Figure 2:
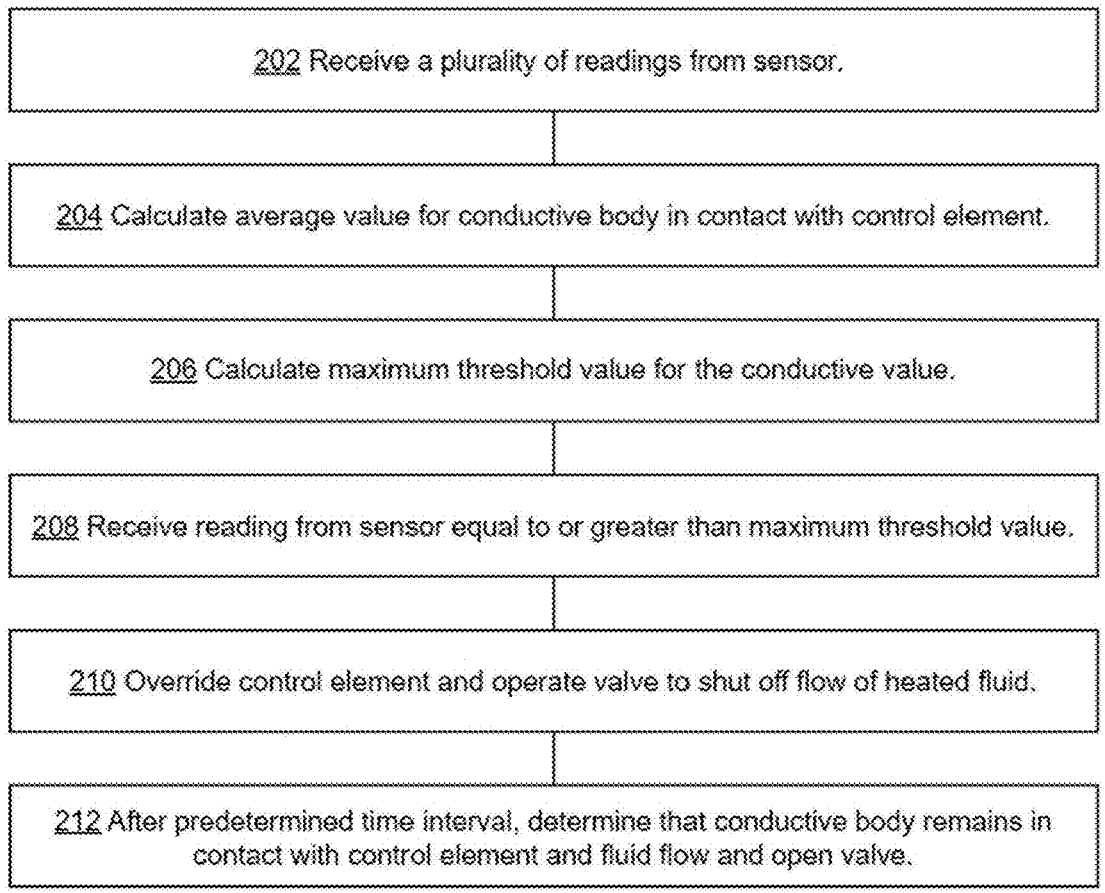
FIG. 2 illustrates a flow diagram of an example sequence of operations performed by a controller according to the present disclosure.

Referring to FIG. 2 a flow diagram of an example sequence of operations performed by a controller according to the present disclosure is shown. Since different people have different voltage potentials due to a variety of factors, when a user first comes into contact with the control element, the controller is configured to determine an average potential value for that user.

Thus, in a first step 202, the controller is configured to take a plurality of readings from the sensor when it detects a user has actuated the control element. There is a time delay before the readings begin to be taken to ensure accuracy.

In a second step 204, the controller then uses the plurality of readings to calculate an average value for the conductive body in contact with the control element—for example by dividing the sum total potential difference by the number of readings considered. This average value will then be used as a baseline for detecting anomalies (see FIG. 4).

Having calculated the baseline, a threshold parameter can then be calculated in step 206 which will be used as a condition for the controller to operate the valve to shut off the flow of liquid. The threshold parameter will be based on the calculated average value and the amount of current being introduced into the flow of liquid by the power source. For example, it may be the sum of these two values.

In step 208, the controller receives a reading which is equal to or greater than the calculated threshold value, i.e. the condition required for shutting off the fluid flow to prevent risk of a burn.

In step 210, the controller then operates the valve to shut off the fluid flow. This overrides the user's actuation of the control element, if the button is still being held down.

Despite these precautions, there may still be instances where the valve shut off was undesired. For example, the user may be washing a conductive object held in their hand, which they wish to continue washing. Thus, the controller is further configured to open the valve again if certain conditions are met.

In step 212, the controller determines that a predetermined amount of time has passed and the conductive body (i.e. the user) is still actuating the control element. The controller removes the override, allowing the valve to open again.

Figure 3:
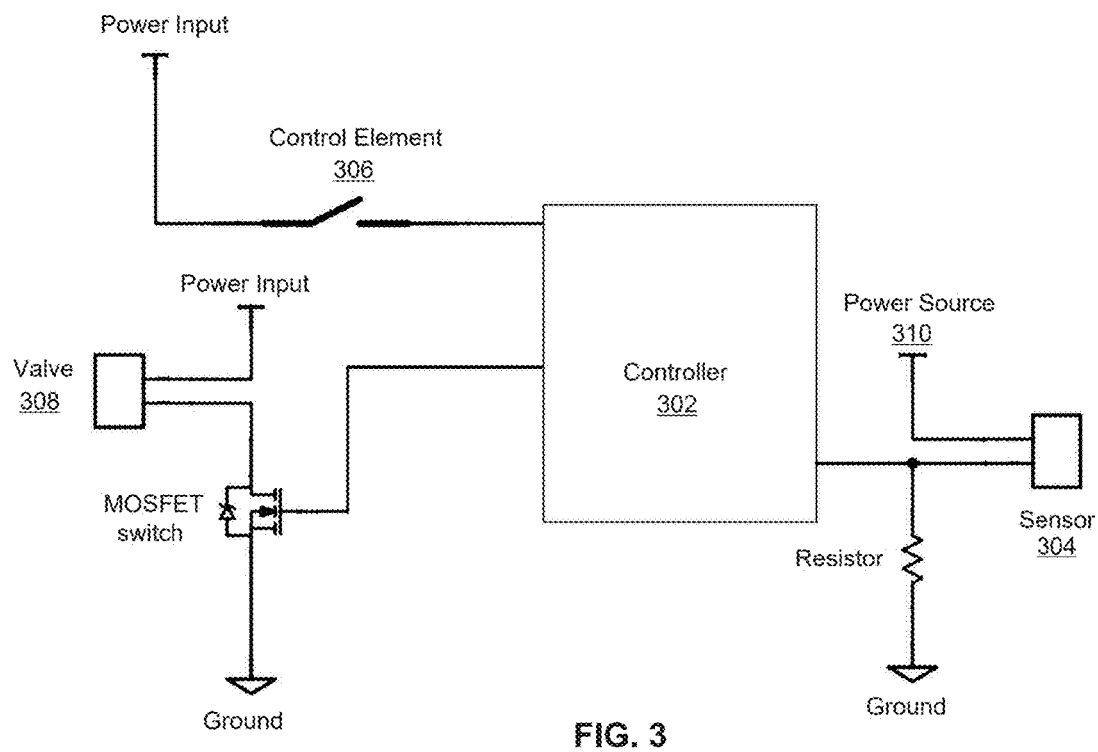
FIG. 3 illustrates a circuit diagram of an example configuration of the disclosed system.

Referring to FIG. 3, a circuit diagram of an example configuration of the disclosed system is shown. This specific design was used in a prototype of the system. The controller 302 used was an Arduino microcontroller with a 5V input voltage stepped down by a buck converter.

A solenoid valve 308 was used for controlling the flow of water through a tap faucet, i.e. the conduit. The solenoid valve 308 consisted of two terminals, and was configured to open the valve 308 and allow boiling water to flow through the tap when both terminals were at a 12V potential difference A 12V supply voltage was provided at one terminal of the solenoid valve 308 by a power input, and the second terminal was connected to the controller 302 and to a ground via a MOSFET switch.

The MOSFET switch was controlled by a pulse signal at the gate terminal of the MOSFET. The MOSFET switch was on, connecting the drain and source and grounding the valve 308, when the gate terminal of the MOSFET received a "high" pulse. Conversely, when a "low" pulse was received at the gate the MOSFET put a high impedance between the drain and source, so the second terminal of the solenoid valve 308 was opened and no 12V potential difference was maintained between its terminals, closing the valve 308 and blocking the fluid flow.

The control element 306 was a metal push button switch which made an electrical connection between a power input and the controller 302 when the button was pushed and disabled the connection as soon as the button 306 was released. The controller 302 sent a low pulse to the MOSFET switch by default, keeping the valve 308 closed. When the button 306 was pushed, the controller 302 switched to sending a high pulse to the solenoid valve 308 via the MOSFET, opening it and allowing water to flow until the push button 306 was released.

The sensor 304 used was a two-wire connector, which had a first terminal connected to the controller 302 and grounded via a 1k resistor, and a second terminal coupled to the conductive push button 306 and a 5V power supply. When the button 306 was pressed and water flowed through the tap, the second terminal of the sensor 304 also became coupled to this flow. The controller 302 was then configured to send a low pulse to the MOSFET whenever a voltage of 5V or less was read across the sensor, overriding any high pulse and shutting the valve 308.

Thus whenever a person had one hand on the push button 306 and their other hand in contact with the water the system would become short-circuited through the body of the person, since their other hand was at the push button and the path for the current was completed through the 1k resistor. This meant that both terminals of the wire connector 304 were shorted, which was detected by controller 302 that closed the valve in response. The user essentially creates the bridge for the current to flow between the water and the push button.

Figure 4:
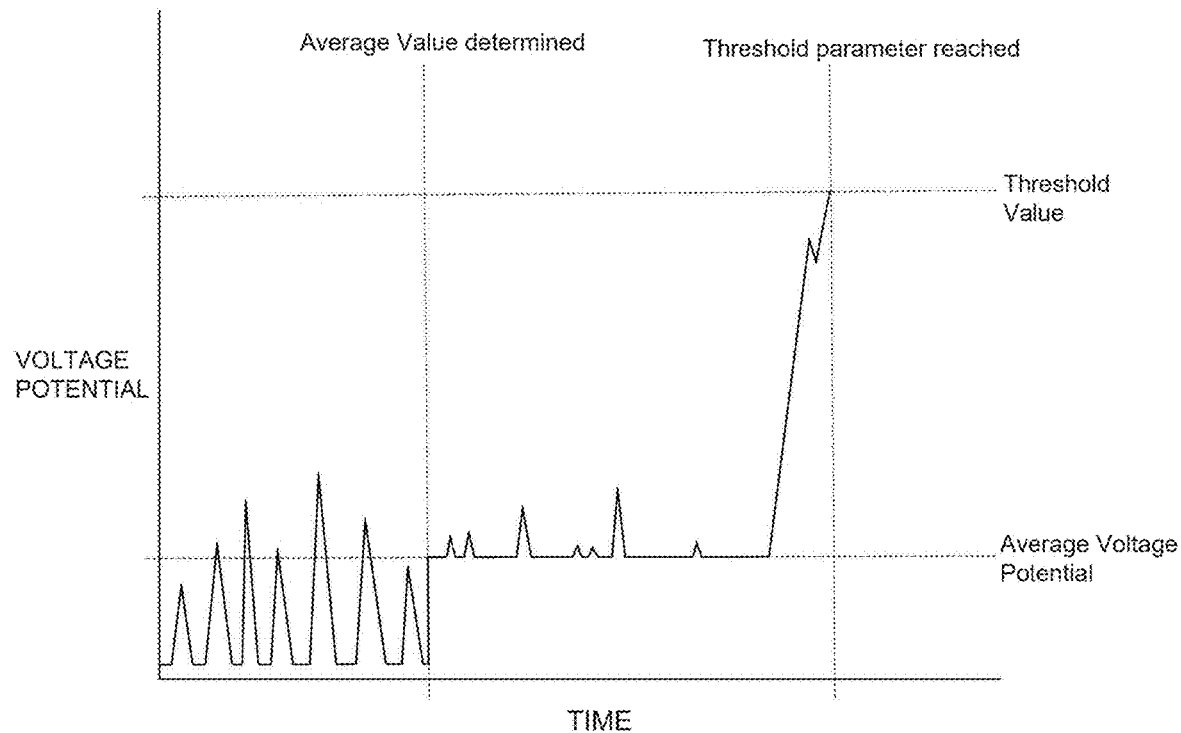
FIG. 4 illustrates an example time versus voltage potential profile that might be measured by a sensor of the disclosed system during its operations.

Referring to FIG. 4, an example time versus voltage potential profile is shown that might be measured by a sensor of the disclosed system during its operations as explained in FIG. 2.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the system and related methods have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A system for delivering heated conductive fluid, the system comprising:
   a conduit (112) for delivering a flow of heated conductive fluid;
   a power source (110) configured to deliver an electric current into the flow;
   a valve (108) coupled to the conduit and configured to control the flow;
   a control element (106), the control element being configured to, upon actuation by a conductive body, cause the valve to open until the actuation is ceased;
   at least one sensor (104) coupled to the control element; and
   a controller, the controller being (102) configured to:
   receive a reading from the at least one sensor;
   determine that the conductive body has come into contact with the electric current from the power source; and
   override the control element and operate the valve to shut off the flow of heated conductive fluid.

2. The system according to claim 1, wherein the controller (102) is further configured to, upon the first actuation of the control element (106) by the conductive body: receive a plurality of readings from the at least one sensor (104); determine an average value for that conductive body from the plurality of readings; and wherein the determination that the conductive body has come into contact with the electric current from the power source (110) is based at least in part on the average value determined for that body.

3. The system according to claim 2, wherein the controller (102) is further configured to determine a maximum threshold parameter based on the average value for a given conductive body and the amount of electric current being introduced to the flow of fluid, and wherein the controller (102) determines that the conductive body has come into contact with the electric current from the power source (110) when a value equal to or greater than the threshold parameter is received from the at least one sensor (104).

4. The system according to claim 3, wherein the controller (102) is further configured to recalculate the threshold parameter periodically during an actuation of the control element (106).

5. The system according to claim 1, wherein the at least one sensor (104) is a current sensor configured to determine the voltage potential of any conductive body that comes into contact with the control element (106).

6. The system according to claim 5, wherein the at least one sensor (104) is also coupled to the conduit (112) such that the at least one sensor (104) detects the voltage potential between the flow of fluid and the control element (106) when both are in contact with a conductive body.

7. The system according to claim 1, wherein the controller (102) is further configured to cause the power source (110)

to introduce the electric current into the flow of fluid in response to actuation of the control element (106).

8. The system according to claim 1, wherein the controller (102) is further configured to, after a predetermined amount of time has elapsed since operating the valve (108) to shut off the flow, determine that the conductive body is still in contact with the control element (106) and re-open the valve (108).

9. The system according to claim 1, wherein the electric current introduced by the power source (110) is a DC current.

10. The system according to claim 9, wherein the DC current is introduced using a voltage between 0 and 240V.

11. The system according to claim 1, wherein the electric current introduced by the power source (110) is an AC current.

12. The system according to claim 1, wherein the control element (106) is a touch-sensitive button.

13. A boiling water tap comprising the system according to claim 1, wherein the conduit (112) is a pipe for delivering a flow to the boiling water tap.

14. The system according to claim 1, wherein the conduit (112) is insulated from the power source (110) such that the power source (110) is coupled directly to the flow of fluid only when the valve (108) is open.

\* \* \* \* \*